United States Patent Office 2,912,296
Patented Nov. 10, 1959

2,912,296
PROCESS FOR IMPROVING THE FASTNESS PROPERTIES OF DYEINGS WITH SUBSTANTIVE DYESTUFFS

Carl Taube and Klaus Böckmann, Leverkusen-Bayerwerk, Germany, assignors to Farbenfabriken Bayer Aktiengesellschaft, Leverkusen, Germany, a corporation of Germany No Drawing. Application August 10, 1954
Serial No. 448,998

Claims priority, application Germany August 17, 1953

5 Claims. (Cl. 8—74)

This invention relates to dyeings with substantive dyestuffs, more especially to improving the fastness to wet treatments of substantive dyeings, and also to products suitable for this purpose.

It has been found that the fastness properties of dyeings with substantive dyestuffs can be improved to a considerable degree by after-treating the dyeings with complex metal compounds of biguanides of polyalkylene imines, preferably of polyethylene imine. The after-treatment is carried out in known manner with the aid of aqueous solutions of the said complex metal compounds at normal or elevated temperature, suitably in a weakly ammoniacal medium.

Suitable complex metal compounds can for instance be obtained by heating aqueous solutions of polyalkylene imines or their mineral acid salts with dicyandiamide, and by adding to the mixture compounds of complex-forming metals, particularly those of copper. The desired complex metal compounds can be obtained in a solid form by concentrating the reaction solutions. The applicable proportions can vary within wide limits; they can easily be ascertained by preliminary tests; suitable ratios are given in the following examples by way of illustration.

The dyeings after-treated according to the invention excel especially in their high fastness to washing. The following examples illustrate the invention but are not to be regarded as limiting it in any way.

*Example 1*

A 3% dyeing on cotton with the dyestuff described in German Patent 758,428 and having the following formula:

is treated with a 0.2–0.3% weakly ammoniacal aqueous solution of the complex copper compound described below, for ½ hour at about 70° C. and using a liquor-to-goods ratio of 20:1. The wet fastness of the dyeing is then considerably improved.

The complex copper compound used was prepared in the following manner: an aqueous solution of 30 gm. of polyethylene-imine (prepared according to U.S. Patent 2,182,306) in 80 ml. of water, 60 ml. of concentrated hydrochloric acid and 42 gm. of dicyandiamide were boiled under reflux for 5 hours. The solution was then treated while hot with 125 gm. of crystallized copper sulfate and the reaction mixture was subsequently evaporated in vacuo.

*Example 2*

An 8% dyeing on cotton with the dyestuff described in German Patent 62,134 and having the following formula:

is treated at room temperature for ½ hour with an aqueous solution of the below described complex copper compound, using a liquor-to-goods ratio of 20:1. The wet fastness of the dyeing is considerably improved by this treatment.

The complex copper compound used was prepared in the following manner: an aqueous solution of 30 gm. of polyethylene-imine in 80 ml. of water, 40 ml. of 50% sulfuric acid and 84 gm. of dicyandiamide were boiled under reflux for 5 hours, while slowly introducing another 40 ml. of 50% sulfuric acid. 25 gm. of copper sulfate (crystals) were added and the reaction mixture was boiled for another 2 hours. The hot, somewhat cloudy, solution was then treated with 100 gm. of copper sulfate (crystals) and evaporated in vacuo.

We claim:

1. The water-soluble copper complex compound obtained by contacting a water-soluble copper salt in aqueous medium with a water-soluble reaction product formed on heating to the boiling point in aqueous medium a water-soluble, viscous polyalkylene imine and dicyandiamide in the presence of a mineral acid, said water-soluble reaction product containing a plurality of units of the following structural formula:

$$\begin{array}{c} -R-N-R- \\ | \\ C=NH \\ | \\ NH \\ | \\ C=NH \\ | \\ NH_2 \end{array}$$

wherein R stands for a lower alkylene radical.

2. The product of claim 1 wherein the lower alkylene radical is ethylene.

3. A process for improving the fastness properties of dyeings with substantive dyestuffs which comprises after-treating the dyeings with a water-soluble copper complex compound of claim 1.

4. A process for improving the fastness properties of dyeings with substantive dyestuffs which comprises after-treating the dyeings with a water-soluble copper complex compound of claim 2.

5. A process for improving the fastness properties of dyeings with substantive dyestuffs which comprises after-treating the dyeings in a weakly ammoniacal medium with a water-soluble copper complex compound of claim 2.

References Cited in the file of this patent
UNITED STATES PATENTS 2,649,354    Hemmi ---------------- Aug. 18, 1953

FOREIGN PATENTS 522,539    Great Britain ---------- June 20, 1940
864,857    Germany -------------- Jan. 29, 1953